United States Patent
Zelesky et al.

(10) Patent No.: US 10,935,243 B2
(45) Date of Patent: Mar. 2, 2021

(54) REGULATED COMBUSTOR LINER PANEL FOR A GAS TURBINE ENGINE COMBUSTOR

(71) Applicant: United Technologies Corporation, Farmington, CT (US)

(72) Inventors: Mark F. Zelesky, Bolton, CT (US); Randal G. McKinney, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 716 days.

(21) Appl. No.: 15/365,179

(22) Filed: Nov. 30, 2016

(65) Prior Publication Data
US 2018/0266686 A1    Sep. 20, 2018

(51) Int. Cl.
*F23R 3/00* (2006.01)
*F02C 3/04* (2006.01)

(52) U.S. Cl.
CPC ............... *F23R 3/002* (2013.01); *F02C 3/04* (2013.01); *F05D 2220/323* (2013.01); *F05D 2240/35* (2013.01); *F23R 2900/03041* (2013.01); *F23R 2900/03042* (2013.01); *F23R 2900/03044* (2013.01); *Y02T 50/675* (2013.01)

(58) Field of Classification Search
CPC .................................. F23R 2900/00012; F23R 2900/03041–03045; F23R 3/002; F23R 3/005; F23R 3/06; F23R 3/08
See application file for complete search history.

(56) References Cited

U.S. PATENT DOCUMENTS

| | | | | |
|---|---|---|---|---|
| 4,158,949 A | * | 6/1979 | Reider | F23R 3/50 60/737 |
| 5,357,744 A | * | 10/1994 | Czachor | F01D 9/065 415/134 |
| 5,363,643 A | * | 11/1994 | Halila | F23R 3/002 60/752 |
| 5,758,503 A | | 6/1998 | DuBell et al. | |
| 5,775,108 A | | 7/1998 | Ansart et al. | |
| 5,775,589 A | | 7/1998 | Vdoviak et al. | |
| 5,782,294 A | * | 7/1998 | Froemming | F01D 5/288 165/168 |

(Continued)

FOREIGN PATENT DOCUMENTS

| EP | 1650503 A1 | 4/2006 | | |
|---|---|---|---|---|
| WO | WO-2014112992 A1 | * | 7/2014 | F23R 3/005 |

(Continued)

OTHER PUBLICATIONS

European Search Report dated Apr. 12, 2018 for corresponding European Patent Application No. 17204788.8.

*Primary Examiner* — Gerald L Sung
*Assistant Examiner* — Rene D Ford
(74) *Attorney, Agent, or Firm* — Bachman & LaPointe, P.C.

(57) ABSTRACT

A liner panel for use in a combustor of a gas turbine engine, the liner panel including a liner panel with a perimeter rail and a multiple of intermediate rails. A combustor for a gas turbine engine including a support shell and a multiple of liner panels mounted to the support shell via a multiple of studs, each of the multiple of liner panels having a multiple of intermediate rails to form a multiple of circumferential cavities.

10 Claims, 9 Drawing Sheets

(56) References Cited

U.S. PATENT DOCUMENTS

| | | | |
|---|---|---|---|
| 6,282,905 B1 | 9/2001 | Sato et al. | |
| 6,925,808 B2 * | 8/2005 | Tiemann | F23M 7/04 |
| | | | 60/722 |
| 7,093,439 B2 * | 8/2006 | Pacheco-Tougas | F23R 3/002 |
| | | | 60/752 |
| 7,363,763 B2 * | 4/2008 | Coughlan, III | F23R 3/002 |
| | | | 60/752 |
| 8,113,004 B2 | 2/2012 | Carlisle et al. | |
| 8,256,224 B2 | 9/2012 | Garry et al. | |
| 8,266,914 B2 | 9/2012 | Hawie et al. | |
| 8,359,865 B2 | 1/2013 | Dierberger et al. | |
| 8,359,866 B2 | 1/2013 | Dierberger et al. | |
| 8,393,155 B2 | 3/2013 | Piper et al. | |
| 8,408,010 B2 | 4/2013 | Garry et al. | |
| 10,047,958 B2 * | 8/2018 | Erbas-Sen | F23R 3/002 |
| 2002/0116929 A1 | 8/2002 | Snyder | |
| 2002/0184892 A1 | 12/2002 | Calvez et al. | |
| 2003/0213250 A1 * | 11/2003 | Pacheco-Tougas | F23R 3/002 |
| | | | 60/752 |
| 2006/0137352 A1 * | 6/2006 | Prasad | F02K 1/827 |
| | | | 60/761 |
| 2007/0144178 A1 | 6/2007 | Burd et al. | |
| 2007/0186558 A1 | 8/2007 | DeSousa et al. | |
| 2007/0186559 A1 | 8/2007 | DeSousa et al. | |
| 2007/0245742 A1 | 10/2007 | Dahlke et al. | |
| 2015/0135720 A1 * | 5/2015 | Papple | F01D 5/186 |
| | | | 60/759 |
| 2015/0354819 A1 * | 12/2015 | Snyder | F23R 3/005 |
| | | | 60/782 |
| 2016/0265771 A1 | 9/2016 | Max et al. | |
| 2017/0159935 A1 | 6/2017 | Drake et al. | |

FOREIGN PATENT DOCUMENTS

| | | | | |
|---|---|---|---|---|
| WO | WO-2015054115 A1 * | 4/2015 | | F23R 3/002 |
| WO | 2015094430 A1 | 6/2015 | | |

* cited by examiner

REGULATED COMBUSTOR LINER PANEL FOR A GAS TURBINE ENGINE COMBUSTOR

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. The combustor section typically includes a combustion chamber formed by an inner and outer wall assembly. Each wall assembly includes a support shell lined with heat shields often referred to as liner panels. Combustor panels are often employed in modern annular gas turbine combustors to form the inner flow path. The panels are part of a two-wall liner and are exposed to a thermally challenging environment.

In typical combustor chamber designs, combustor Impingement Film-Cooled Floatwall (IFF) liner panels typically include a hot side exposed to the gas path. The opposite, or cold side, has features such as cast in threaded studs to mount the liner panel and a full perimeter rail that contacts the inner surface of the liner shell to provide a desired pressure drop. In some instances, loss of a portion of the perimeter rail may result in a reduction to the pressure drop which may negatively impact cooling thereof.

SUMMARY

A liner panel for use in a combustor of a gas turbine engine, the liner panel according to one disclosed non-limiting embodiment of the present disclosure can include a liner panel with a perimeter rail and a multiple of intermediate rails.

A further embodiment of the present disclosure may include, wherein the multiple of intermediate rails are parallel to an aft perimeter rail.

A further embodiment of the present disclosure may include, wherein the multiple of intermediate rails are axially spaced.

A further embodiment of the present disclosure may include, wherein the multiple of intermediate rails are angled to an aft perimeter rail.

A further embodiment of the present disclosure may include, wherein the multiple of intermediate rails are perpendicular to an aft perimeter rail.

A further embodiment of the present disclosure may include, wherein at least one of the multiple of intermediate rails is perpendicular to an aft perimeter rail and at least one of the multiple of intermediate rails is parallel to an aft perimeter rail.

A liner panel for use in a combustor of a gas turbine engine, according to another disclosed non-limiting embodiment of the present disclosure can include a liner panel with a perimeter rail and a multiple of intermediate circumferential rails.

A further embodiment of the present disclosure may include, wherein the multiple of circumferential rails are parallel to an aft perimeter rail.

A further embodiment of the present disclosure may include, wherein at least one of the multiple of intermediate rails includes a thru aperture.

A further embodiment of the present disclosure may include, wherein the liner panel is an aft liner panel.

A further embodiment of the present disclosure may include, wherein the liner panel is a forward liner panel.

A combustor for a gas turbine engine according to another disclosed non-limiting embodiment of the present disclosure can include a support shell and a multiple of liner panels mounted to the support shell via a multiple of studs, each of the multiple of liner panels having a multiple of intermediate rails to form a multiple of circumferential cavities.

A further embodiment of the present disclosure may include, wherein the multiple of intermediate rails are parallel to an aft perimeter rail.

A further embodiment of the present disclosure may include, wherein the multiple of intermediate rails are axially spaced.

A further embodiment of the present disclosure may include, wherein the liner panel is an aft liner panel.

A further embodiment of the present disclosure may include, wherein the liner panel is a forward liner panel.

A further embodiment of the present disclosure may include, wherein the multiple of intermediate rails are axially spaced.

A further embodiment of the present disclosure may include, wherein the multiple of intermediate rails are angled to an aft perimeter rail.

A further embodiment of the present disclosure may include, wherein the multiple of intermediate rails are perpendicular to an aft perimeter rail.

A further embodiment of the present disclosure may include, wherein at least one of the multiple of intermediate rails is perpendicular to an aft perimeter rail and at least one of the multiple of intermediate rails is parallel to an aft perimeter rail.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
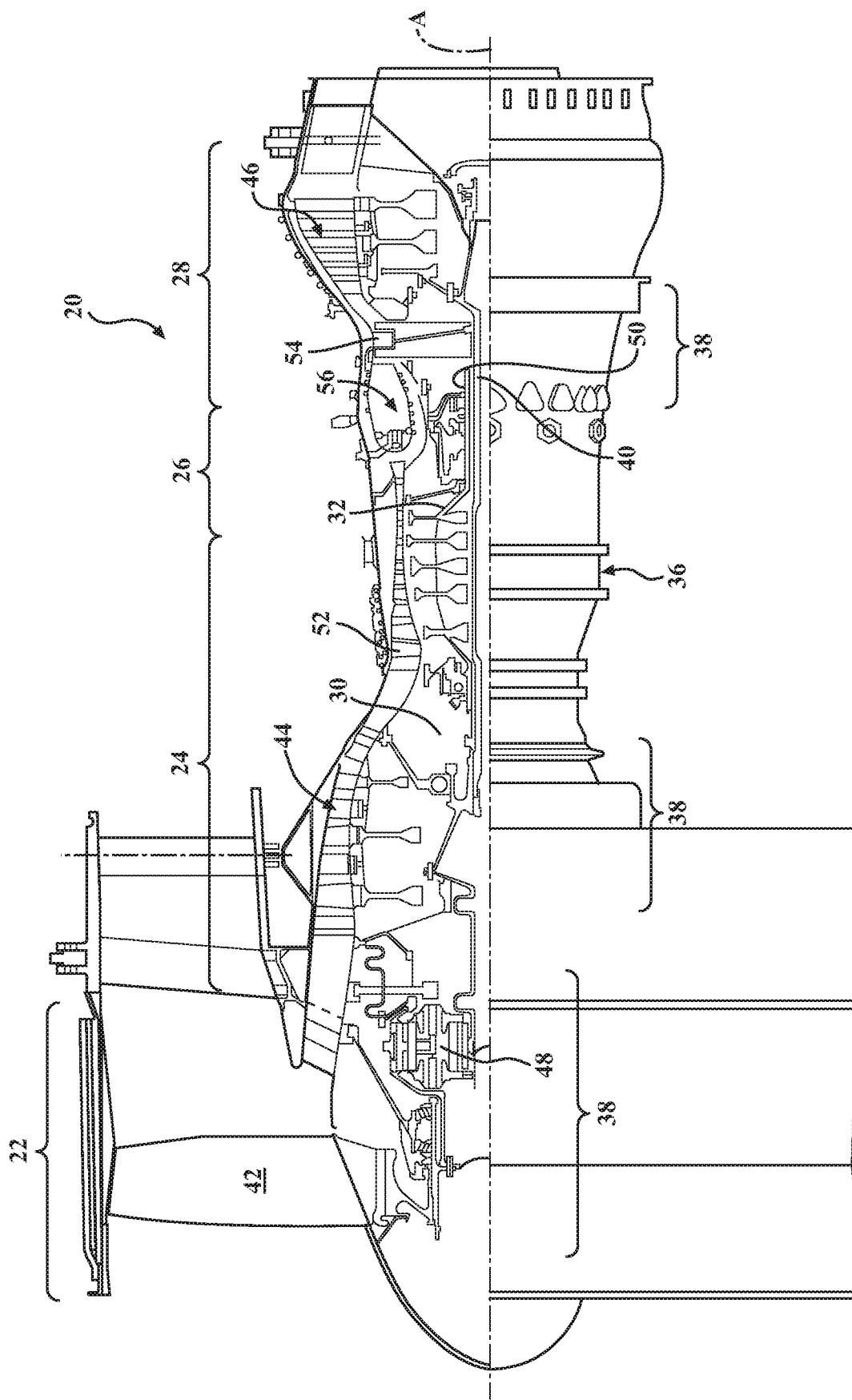
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures might include an augmentor section among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow due to the high bypass ratio. The fan section 22 of the gas turbine engine 20 is designed for a particular flight condition—typically cruise at about 0.8 Mach and about 35,000 feet (10668 m). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
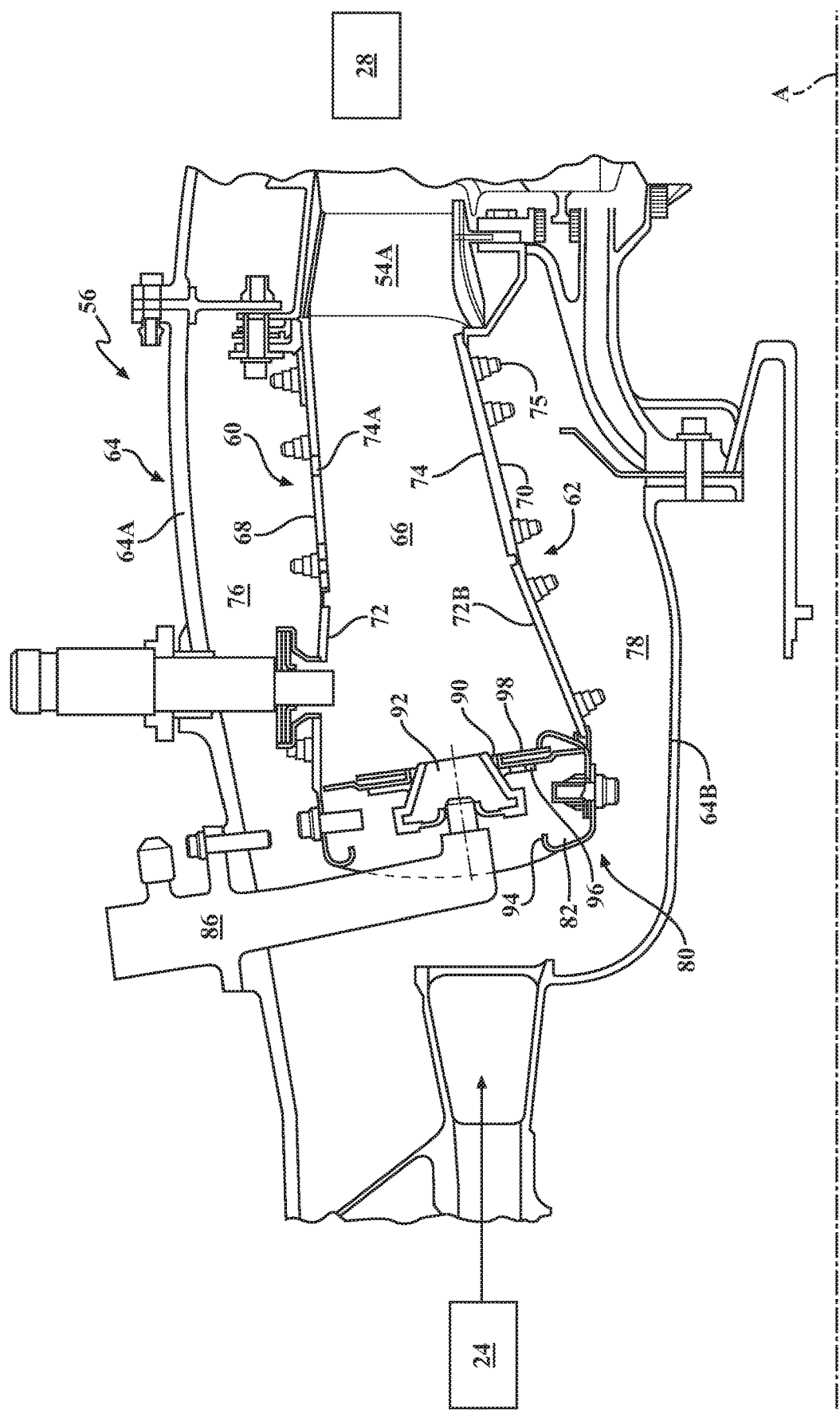
FIG. 2 is an expanded longitudinal schematic sectional view of a combustor section according to one non-limiting embodiment that may be used with the example gas turbine engine architectures.

With reference to FIG. 2, the combustor section 26 generally includes a combustor 56 with an outer combustor wall assembly 60, an inner combustor wall assembly 62, and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 74A that are circumferentially staggered to line the outer shell 68. A multiple of forward liner panels 72B and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
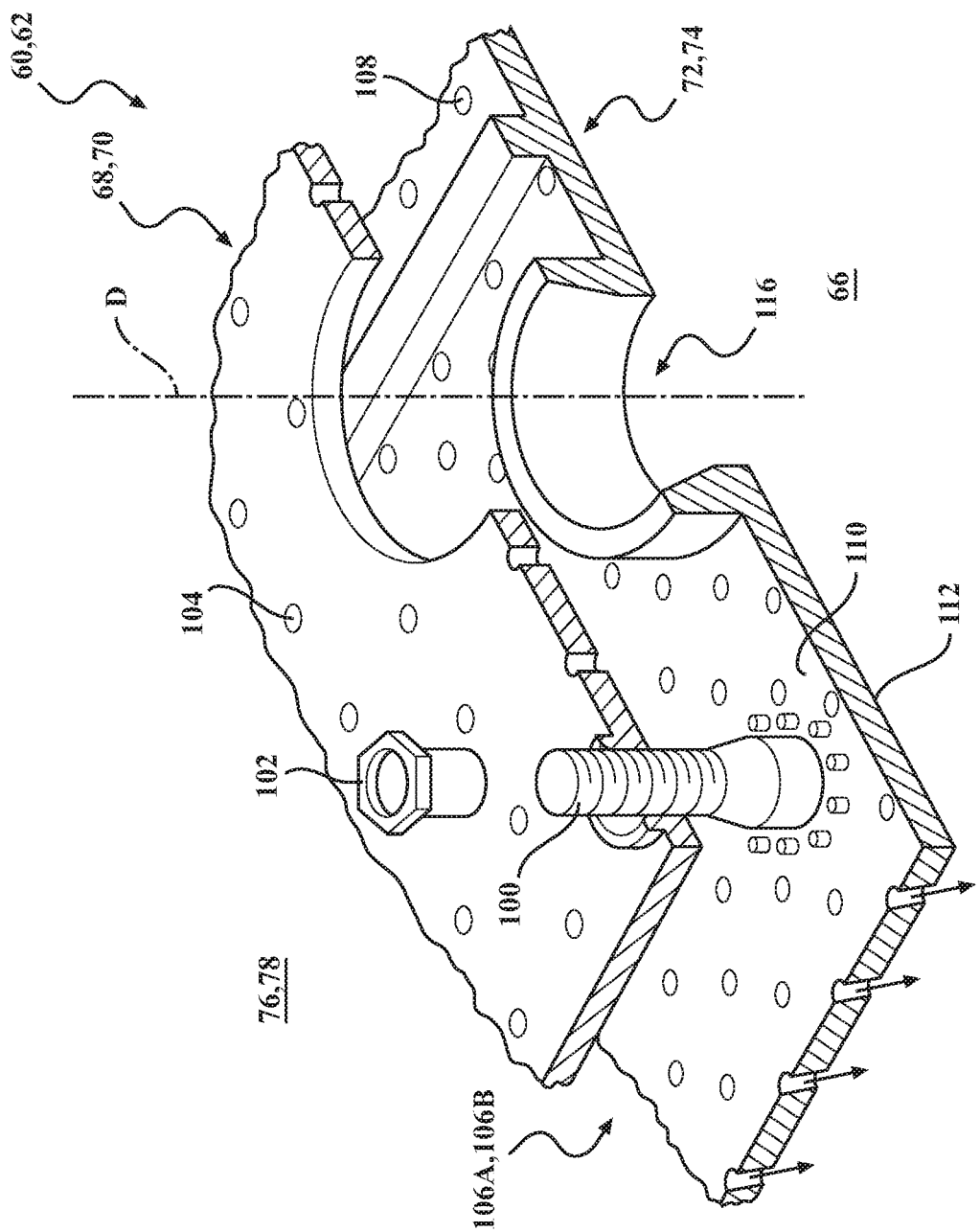
FIG. 3 is an exploded partial sectional view of a portion of a combustor wall assembly.

With reference to FIG. 3, a multiple of studs 100 extend from each of the liner panels 72, 74 so as to permit a liner array (partially shown in FIG. 4) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof (FIG. 5).

A multiple of cooling impingement passages 104 penetrate through the support shells 68, 70 to allow air from the respective annular plenums 76, 78 to enter cavities 106 formed in the combustor walls 60, 62 between the respective support shells 68, 70 and liner panels 72, 74. The impingement passages 104 are generally normal to the surface of the liner panels 72, 74. The air in the cavities 106 provides cold side impingement cooling of the liner panels 72, 74 that is generally defined herein as heat removal via internal convection.

A multiple of effusion passages 108 penetrate through each of the liner panels 72, 74. The geometry of the passages, e.g., diameter, shape, density, surface arcuate surface, incidence arcuate surface, etc., as well as the location of the passages with respect to the high temperature combustion flow also contributes to effusion cooling. The effusion passages 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112.

Figure 6:
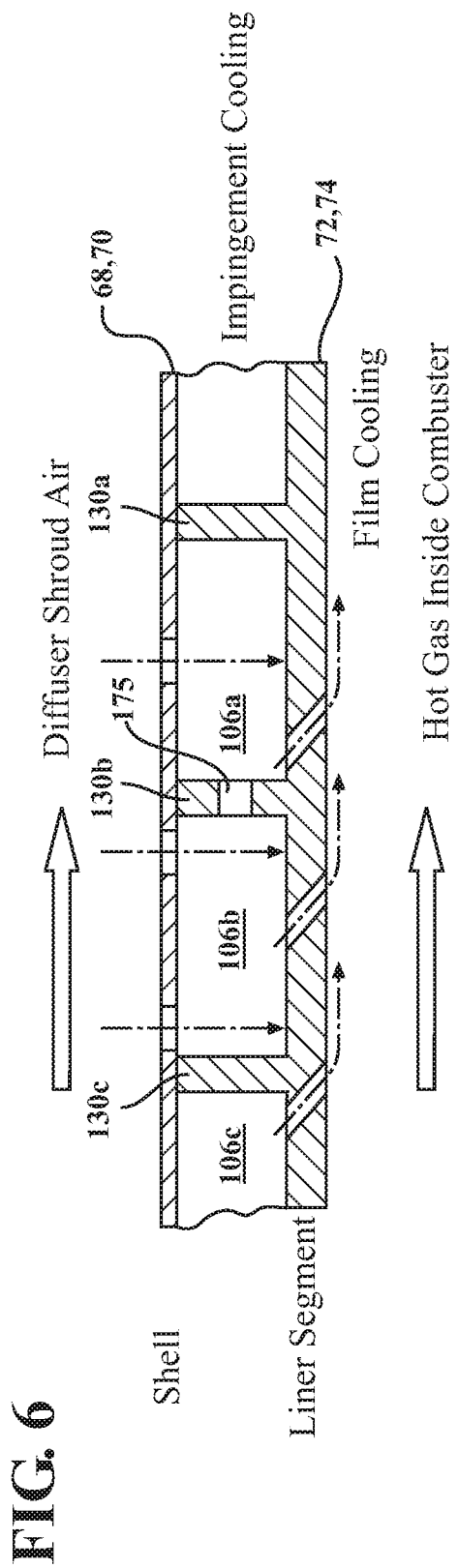
FIG. 6 is a sectional view of a portion of a combustor wall assembly.

In one example, each of the multiple of effusion passages 108 are typically 0.025" (0.635 mm) in diameter and define a surface arcuate surface section of about thirty (30) degrees with respect to the cold side 110 of the liner panels 72, 74. The effusion passages 108 are generally more numerous than the impingement passages 104 and promote film cooling along the hot side 112 to shield the liner panels 72, 74 (FIG. 6). Film cooling as defined herein is the introduction of a relatively cooler air at one or more discrete locations along a surface exposed to a high temperature environment to protect that surface in the region of the air injection as well as downstream thereof.

The combination of impingement passages 104 and effusion passages 108 may be referred to as an Impingement Film Floatwall (IFF) assembly. A multiple of dilution passages 116 are located in the liner panels 72, 74 each along a common axis D. For example only, the dilution passages 116 are located in a circumferential line W (shown partially in FIG. 4). Although the dilution passages 116 are illustrated in the disclosed non-limiting embodiment as within the aft liner panels 72B, 74B, the dilution passages may alternatively be located in the forward liner panels 72A, 72B or in a single liner panel which replaces the fore/aft liner panel array. Further, the dilution passages 116 although illustrated in the disclosed non-limiting embodiment as integrally formed in the liner panels, it should be appreciated that the dilution passages 116 may be separate components. Whether integrally formed or separate components, the dilution passages 116 may be referred to as grommets.

Figure 4:
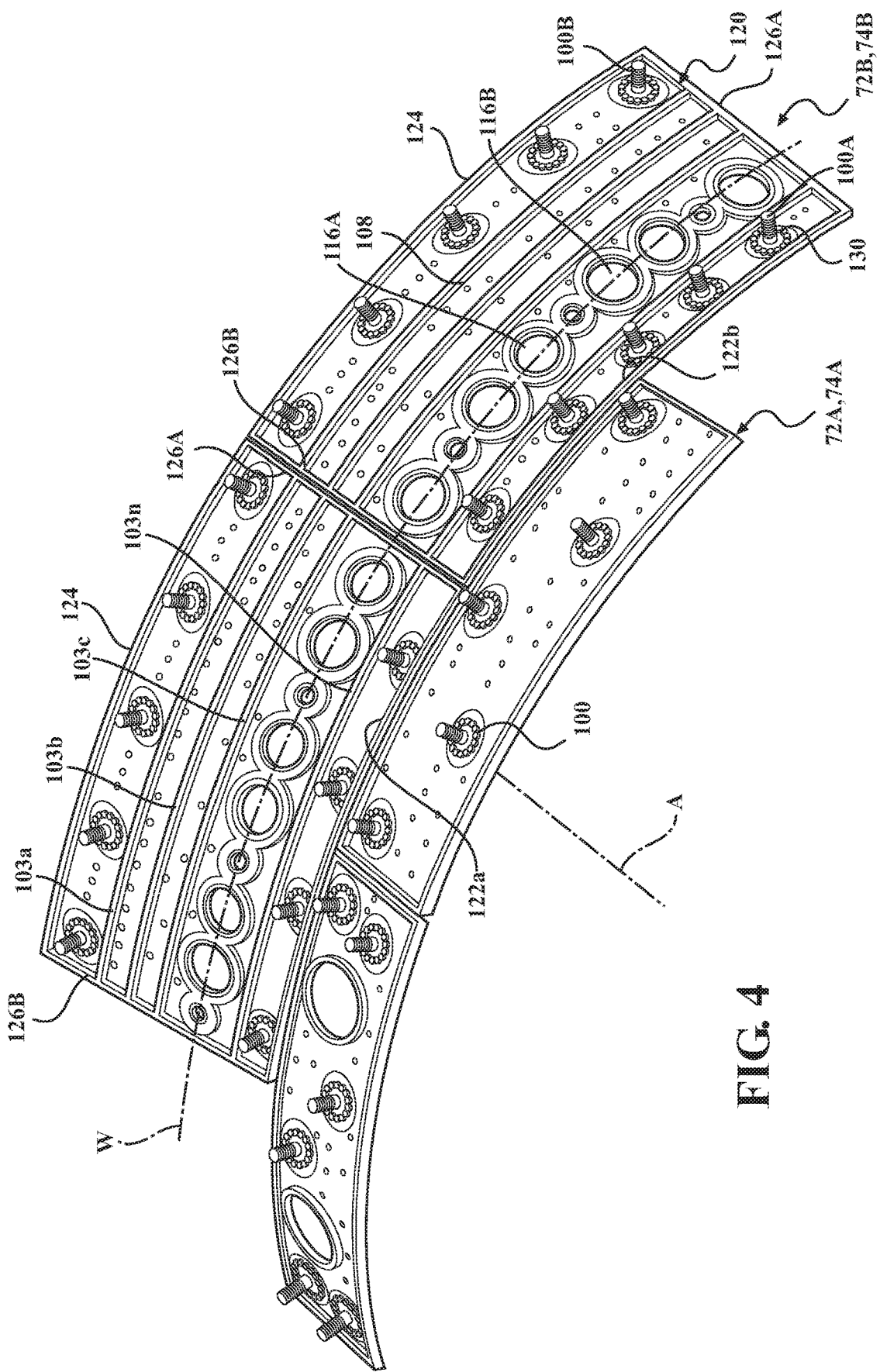
FIG. 4 is a perspective cold side view of a portion of a liner panel array.
Figure 5:
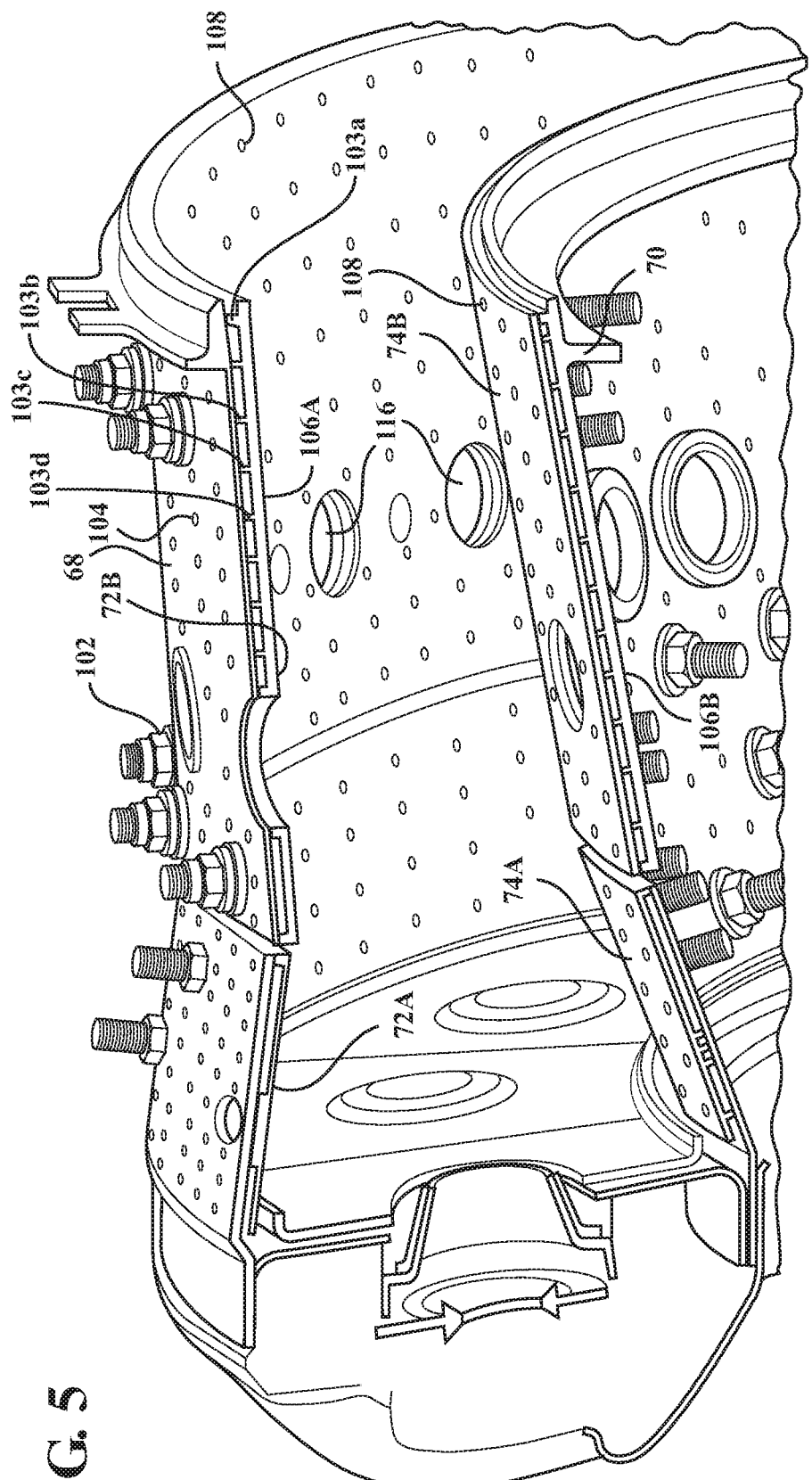
FIG. 5 is a perspective partial sectional view of a combustor.

With reference to FIG. 4, in one disclosed non-limiting embodiment, each of the forward liner panels 72A, 72B, and the aft liner panels 74A, 74B in the liner panel array includes a perimeter rail 120a, 120b formed by a forward circumferential rail 122a, 122b, an aft circumferential rail 124a, 124b, and axial rail 126Aa 126Ab, 126Ba, 126Bb, that interconnect the forward and aft circumferential rail 122a, 122b, 124a, 124b. The perimeter rail 120a, 120b define the edge of the respective forward liner panels 72A, 72B, and the aft liner panels 74A, 74B to seal each liner panel with respect to the respective support shell 68, 70 to form the impingement cavity 106 therebetween. That is, the forward and aft circumferential rail 122a, 122b, 124a, 124b are located at relatively constant curvature shell interfaces while the axial rail 126Aa, 126Ab, 126Ba, 126Bb, extend across an axial length of the respective support shell 68, 70 to complete the perimeter rail 120a, 120b that seals the forward liner panels 72A, 72B, and the aft liner panels 74A, 74B to the respective support shell 68, 70.

A multiple of studs 100 are located adjacent to the respective forward and aft circumferential rail 122a, 122b, 124a, 124b. Each of the studs 100 may be at least partially surrounded by posts 103 to at least partially support the fastener 102 and provide a stand-off between each forward liner panels 72A, 72B, and the aft liner panels 74A, 74B and respective support shell 68, 70.

The dilution passages 116 are located downstream of the forward circumferential rail 122a, 122b in the aft liner panels 72B, 74B to quench the hot combustion gases within the combustion chamber 66 by direct supply of cooling air from the respective annular plenums 76, 78. That is, the dilution passages 116 pass air at the pressure outside the combustion chamber 66 directly into the combustion chamber 66.

Figure 7:
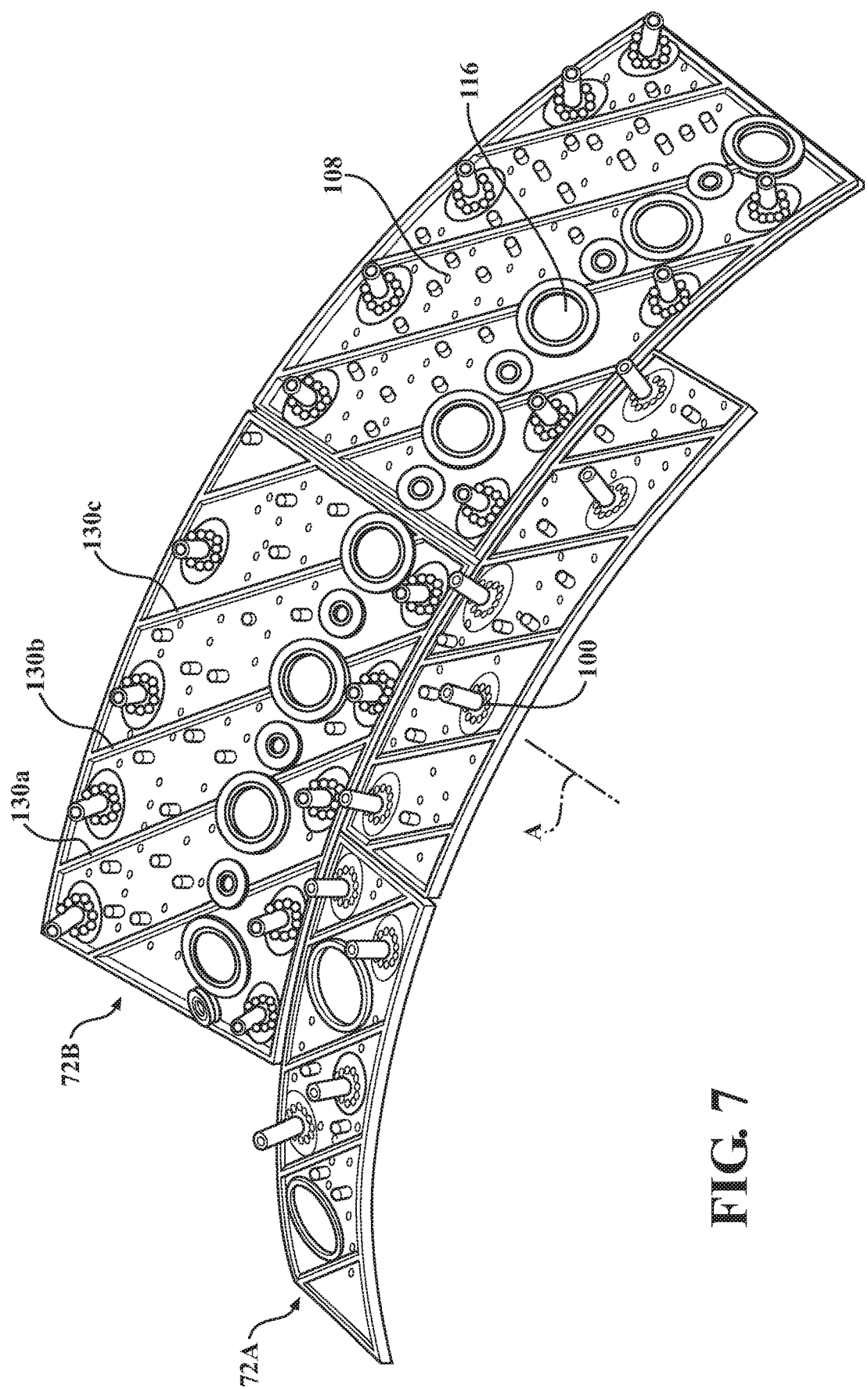
FIG. 7 is a perspective cold side view of a portion of a liner panel array.

The aft liner panels 74A, 74B include a multiple of intermediate rails 130a, 130b, 130c, . . . , 130n, that are parallel to and forward of the aft circumferential rail 124a, 124b. That is, the multiple of intermediate rails 130a, 130b, 130c, . . . , 130n, segment the cavities 106 into a multiple of circumferential cavities 160a, 106b, 106c, . . . 106n, formed in the combustor walls 60, 62 between the respective support shells 68, 70 and liner panels 72, 74 to pressure regulate the flow therein (FIG. 7). The multiple of intermediate rails 130a, 130b, 130c, . . . , 130n may be evenly spaced axially, unevenly spaced axially, or selectively spaced based on desired pressures within the cavities 106a, 106b, 106c, . . . , 106n, formed thereby. Further, any number of intermediate rails 130a, 130b, 130c, . . . , 130n may be provided. In one example, the intermediate rails 130a, 130b, 130c, . . . , 130n may be spaced about 0.25 inches apart for a liner panel of about 3.0 inches in length. One or more of the multiple of intermediate rails 130a, 130b, 130c, . . . , 130n, may also include a thru aperture 175 to further balance the cooling airflow therebetween (FIG. 6).

Should the aft circumferential rail 124a, 124b burns off, only the aft most film holes aft of the aftmost intermediate rails 130a, 130b, 130c, . . . , 130n will reduce flow into the cavities 106, while the remainder of the film holes will flow as designed. That is, the velocity of the air suppresses the static pressure in the cavities segregated by the intermediate rails 130a, 130b, 130c, . . . , 130n to maintain the flow out the film holes.

Figure 8:
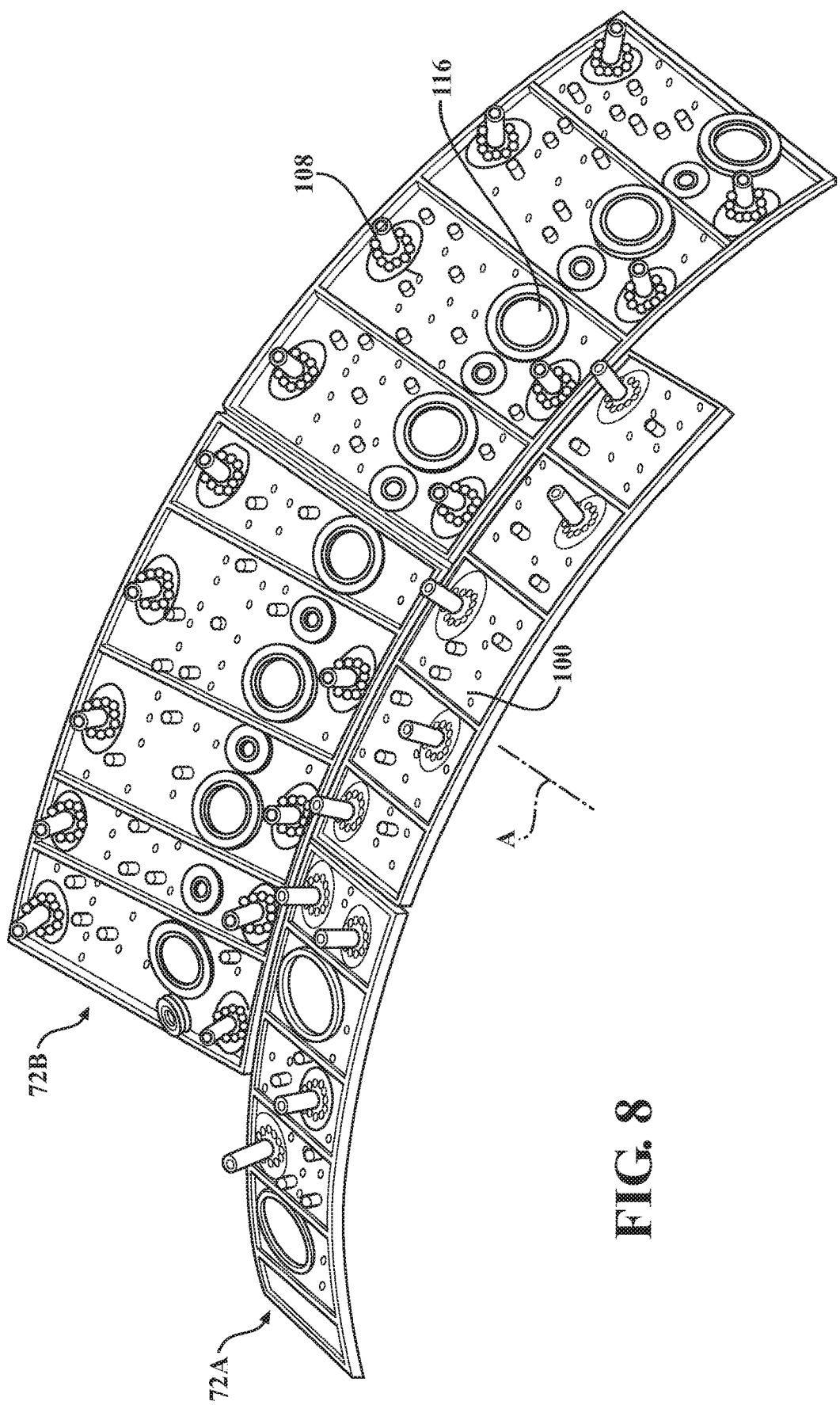
FIG. 8 is a perspective cold side view of a portion of a liner panel array.
Figure 9:
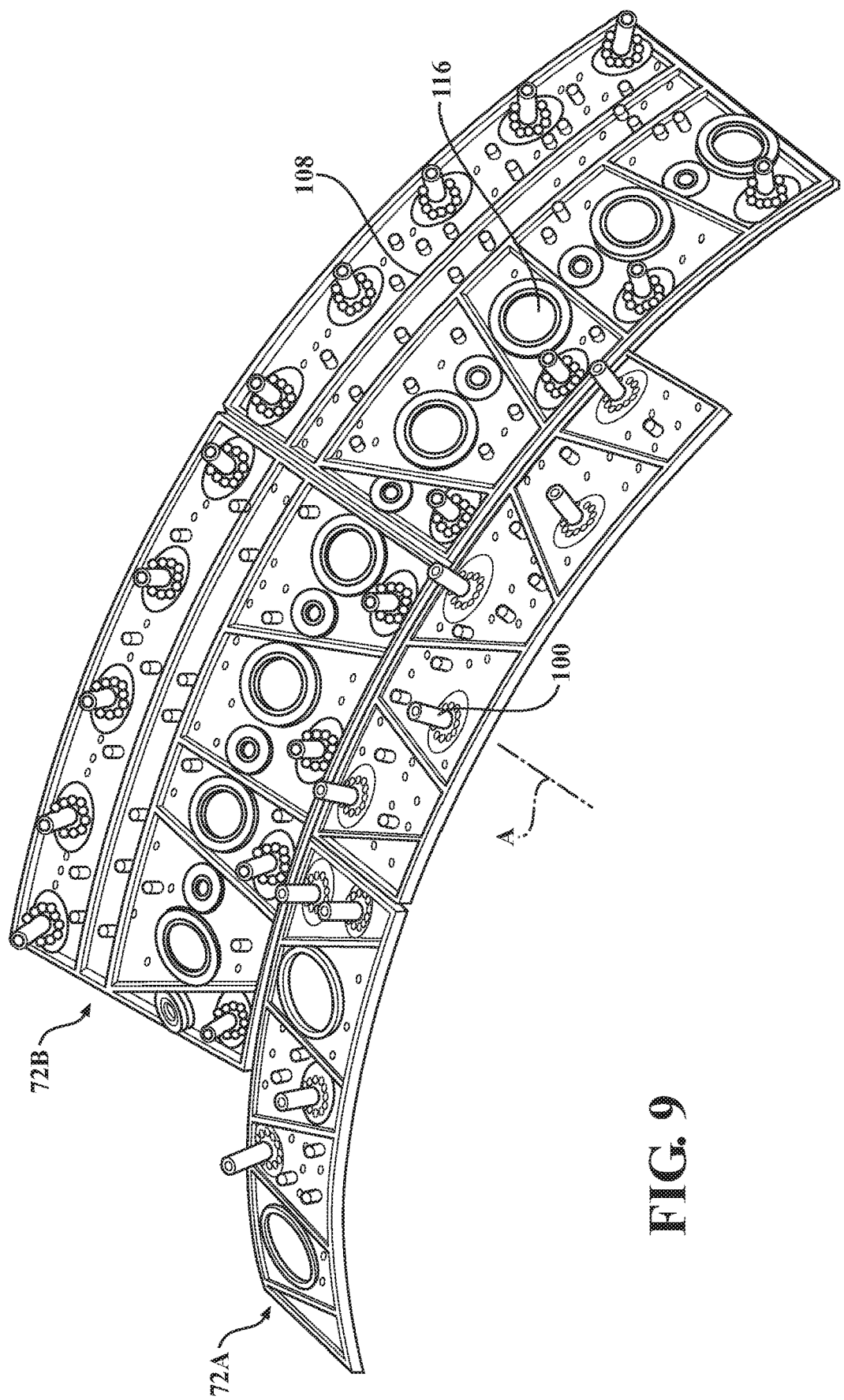
FIG. 9 is a perspective cold side view of a portion of a liner panel array.

With reference to FIG. 7, in another disclosed non-limiting embodiment, the intermediate rails 130a, 130b, 130c, . . . , 130n may be angled with respect to the aft circumferential rail 124a, 124b and may span the orientation thereto from parallel (FIG. 4) to perpendicular (FIG. 8) and provide combinations thereof (FIG. 9).

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A liner panel for use Ma combustor of a gas turbine engine, the liner panel comprising:
    a perimeter rail that extends from a cold side of the liner panel, the perimeter rail formed by a forward circumferential rail, an aft circumferential rail, and axial rails that interconnect the forward and aft circumferential rails;
    a multiple of intermediate rails within the perimeter rail, the multiple of intermediate rails extend from the cold side of the liner panel parallel to the forward circumferential rail and the aft circumferential rail, at least one of the multiple of intermediate rails includes a through aperture;
    a dilution passage between two of the multiple of intermediate rails;
    a first stud that extends from the cold side of the liner panel between a first one of the multiple of intermediate rails and the forward circumferential rail; and
    a second stud that extends from the cold side of the liner panel between a second one of the multiple of intermediate rails and the aft circumferential rail;
    wherein a plurality of the multiple of intermediate rails is positioned between the dilution passage and the second stud.

2. The liner panel as recited in claim 1, wherein the through aperture is parallel to the cold side of the liner panel.

3. The liner panel as recited in claim 2, wherein the through aperture is parallel to the forward circumferential rail and the aft circumferential rail.

4. The liner panel as recited in claim 1, wherein the multiple of intermediate rails segment a cavity between the liner panel and a shell to which the liner panel is mounted into a multiple of circumferential cavities.

5. The liner panel as recited in claim 4, wherein the through aperture communicates airflow to balance the cooling airflow across one of the multiple of intermediate rails.

6. A liner panel for use in a combustor of a gas turbine engine, the liner panel comprising:
    a perimeter rail that extends from a cold side of the liner panel, the perimeter rail formed by a forward circumferential rail, an aft circumferential rail, and axial rails that interconnect the forward and aft circumferential rails;
    a multiple of intermediate rails within the perimeter rail, the multiple of intermediate rails extend from the cold side of the liner panel parallel to the axial rails between the forward circumferential rail and the aft circumferential rail, at least one of the multiple of intermediate rails includes a through aperture;
    a dilution passage between two of the multiple of intermediate rails; and
    at least one stud of a plurality of studs that extends from the cold side of the liner panel between each two of the multiple of intermediate rails;
    wherein all of the plurality of studs are circumferentially offset from the multiple of intermediate rails.

7. The liner panel as recited in claim 6, wherein the liner panel is an aft liner panel that surrounds a combustion chamber.

8. The liner panel as recited in claim 6, wherein the liner panel is a forward liner panel that surrounds a combustion chamber.

9. The liner panel as recited in claim 6, wherein the multiple of intermediate rails segment a cavity between the liner panel and a shell to which the liner panel is mounted into a multiple of axial cavities.

10. The liner panel as recited in claim 5, wherein the through aperture communicates airflow to balance the cooling airflow across one of the multiple of intermediate rails.

* * * * *